United States Patent [19]

Comroe et al.

[11] 4,409,836

[45] Oct. 18, 1983

[54] APPARATUS AND METHOD FOR DETECTING THE CESSATION OF MOTION OF A BODY

[75] Inventors: Richard A. Comroe, East Dundee; Michael D. Kotzin, Hoffman Estates; Anthony P. van den Heuvel, Arlington Heights, all of Ill.

[73] Assignee: Motorola, Inc., Schaumburg, Ill.

[21] Appl. No.: 321,342

[22] Filed: Nov. 13, 1981

[51] Int. Cl.$^3$ .............................................. G01P 9/04
[52] U.S. Cl. ......................................... 73/504; 73/505
[58] Field of Search .................... 73/504, 505, 518; 324/160

[56] References Cited

U.S. PATENT DOCUMENTS

| | | | |
|---|---|---|---|
| 2,514,250 | 7/1950 | Meredith | 73/505 |
| 3,017,775 | 1/1962 | Entin | 73/505 |
| 3,113,463 | 12/1963 | Holt | 73/505 |
| 3,191,443 | 6/1965 | Hunt | 73/505 |
| 3,273,397 | 9/1966 | Forward | 73/382 |
| 3,349,627 | 10/1967 | Hauf et al. | 73/505 |
| 3,520,195 | 7/1970 | Tehon | 73/505 |
| 3,683,378 | 8/1972 | Polhemus . | |
| 3,842,681 | 10/1974 | Mumme | 73/505 |

Primary Examiner—James J. Gill
Attorney, Agent, or Firm—Mark P. Kahler; Edward M. Roney; James W. Gillman

[57] ABSTRACT

An apparatus and a method are provided for determining when a moving body assumes a motionless state. A rate of turn sensor is attached to the moving body. A signal indicating that the body is substantially motionless is generated when the rate of turn signal generated by the sensor is substantially constant.

6 Claims, 8 Drawing Figures

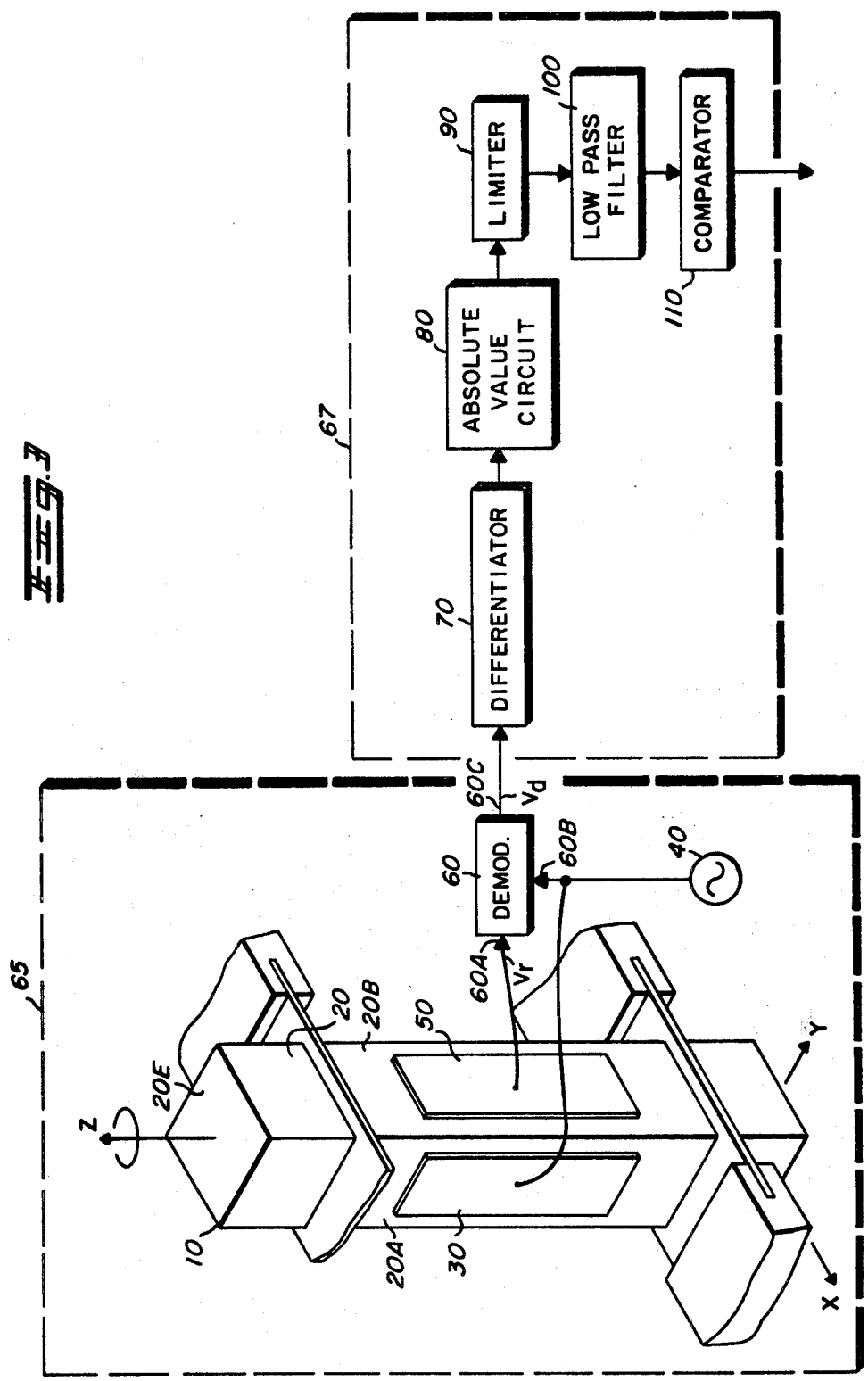

APPARATUS AND METHOD FOR DETECTING THE CESSATION OF MOTION OF A BODY

BACKGROUND OF THE INVENTION

This invention relates generally to vehicle location systems employing rate of turn sensors to determine vehicle heading, and more particularly to a system for determining when a moving vehicle is stopped. A vehicle location system is thus provided with relevant data regarding vehicle motion.

DESCRIPTION OF THE PRIOR ART

In the past, vehicle location systems have employed data derived from speedometers, odometers and compasses situated within a vehicle to determine the changing location of the vehicle.

In more contemporary conventional vehicle location systems, rate of turn sensors such as vibrating bar rate gyros may be situated in a moving vehicle and used to determine the heading of the vehicle as it turns. Such rate of turn sensors generate a rate of turn signal together with an undesired slowly varying DC offset voltage signal (noise signal).

Since vehicle heading is determined by integration of the rate of turn signal, the offset voltage signal generated along with the rate of turn signal results in inaccuracies of vehicle heading unless such offset voltage is compensated for. The offset voltage must therefore be determined.

The ideal rate of turn sensor would exhibit no output signal when the vehicle containing the sensor is stopped or undergoing zero heading change. In nonideal, physically realizable rate of turn sensors, any sensor output signal existing while the vehicle is stopped is attributable to the undesired offset voltage. The offset voltage is thus readily determined by direct measurement of the sensor output signal when the vehicle is stopped. Therefore, it is imperative to determine precisely when a vehicle is stopped in order to determine the offset voltage and compensate for the same.

As a prerequisite for understanding the present invention which provides for more accurately determining when a vehicle containing a rate of turn sensor is stopped, it is helpful to first understand the basics of rate of turn sensors such as vibrating bar rate gyros. FIG. 1 shows a conventional angular rotation rate (derivative of heading) determining apparatus including a vibratory bar rate gyro 10. Gyro 10 includes a substrate 20 of hard material exhibiting low acoustic loss and a mechanical Q of approximately 1000 or more. It is known in the art that suitable materials for substrate 20 are steel, stainless steel, glass and quartz, for example. Substrate 20 is rectilinearly shaped and exhibits a length (L) greater than the width dimensions (W$_1$) and (W$_2$) thereof as seen more clearly in FIG. 2A. For purposes of discussion, the conventional X, Y, Z axis coordinate system will be employed to discuss gyro 10. As seen in FIG. 2A, gyro 10 is longitudinally (lengthwise) oriented in the Z axis direction and exhibits the aforementioned rectilinear shape.

As seen in FIG. 1 and FIG. 2A, substrate 20 includes side surfaces 20A, 20B, 20C and 20D. Substrate 20 further includes surfaces 20E and 20F at the opposed ends thereof. A driver transducer 30 such as a piezoelectric transducer is situated on surface 20A. An alternating current source 40 is electrically coupled to driver transducer 30 as shown in FIG. 1. Source 40 generates a signal exhibiting a frequency near the resonant frequency of substrate 20 such that transducer 30 and substrate 20 are excited into vibration. It is assumed that angular rotation (rate of turn) about the Z axis is desired to be determined. If no such angular rotation about the Z axis is present, the vibrations in substrate 20 induced by source 40 in conjunction with driver transducer 30 will be entirely in the X axis direction. However, if the gyro 10 is angularly rotated about the Z axis, Coriolis forces are generated in substrate 30 in the Y axis direction. Such Coriolis forces are directly proportional to the angular velocity of the angular rotation about the Z axis. These Coriolis forces generate vibrations in substrate 20 in the Y axis direction. A readout transducer, for example a piezoelectric transducer, is situated on surface 20B to sense such vibrations in the Y axis direction. More specifically, readout transducer 50 generates an alternating voltage (readout signal) exhibiting the frequency of source 40 but modulated in amplitude by a signal which is linearly related to the angular velocity of gyro 10 about the Z axis thereof, that is, the derivative of the heading of gyro 10. Readout transducer 50 is coupled to the signal input 60A of a synchronous demodulator 60. Demodulator 60 includes a reference input 60B coupled to source 40 such that the readout signal generated by readout transducer 50 is synchronously demodulated with respect to the frequency of alternating voltage source 40. Thus, the signal generated at the output 60C of demodulator 60 exhibits indicia of the angular velocity applied to gyro 20 about the Z axis.

It is noted that transducers 55 and 57 are situated on side surfaces 20C and 20D, respectively, to balance gyro 10. Transducers 55 and 57 may be functional transducers or dummy transducers.

It is understood that gyro 10 may be situated in a moving vehicle to determine the instantaneous angular heading thereof about the Z axis oriented vertically within the vehicle. As already briefly mentioned, a significant problem encountered when employing rate of turn sensors such as a vibrating bar gyro to determine the heading or angular velocity of a moving vehicle is the offset signal A (noise signal) which is generated at readout transducer 50 as an undesired component of the readout signal. Such offset signal A contaminates the readout signal generated at readout transducer 50 which includes the desired actual rotation information (that is, rate of turn information). The readout signal generated at readout transducer 50 is designated V$_r$ and is given by equation 1 as follows:

$$V_r = (A + B\Omega \cos \theta) \sin 2\pi f_v t \qquad \text{Equation 1}$$

In equation 1, A equals the unknown slowly varying offset voltage signal; B is the known rate scale factor for the gyro about its sense axis (longitudinal axis); $\Omega$ is the actual rate of rotation of the vehicle or other platform on which the gyro is mounted about the Z axis; $f_v$ is the vibration frequency of substrate 20 and t is time. As seen in FIG. 2B, vibrating bar gyro 10 is inclined at some angle $\theta$ with respect to the axis about which rotation rate is to be measured (here the Z axis). $\theta$ is assumed to be constant. In one embodiment, $\theta$ conveniently equals zero.

The signal V$_r$ is synchronously demodulated by demodulator 50 which thus generates an output signal V$_d$ (rate of turn signal) given by the following equations:

$$V_d = k_1(A + B\Omega \cos \theta) \qquad \text{Equation 2}$$

In equation 2, $k_1$ is known gain constant. B and $\theta$ are both known. By examining equation 2 it is seen that in order to determine the rate of rotation, $\Omega$, of the vehicle, the offset signal A must first be accurately determined. From the above mathematical analysis it is seen that an accurate means must be provided for determining when the vehicle is stopped such that offset signal A may be measured and compensated for.

One object of the present invention is to employ a rate of turn sensor to accurately determine when a vehicle is stopped.

Other objects of the invention will become apparent to those skilled in the art upon consideration of the following description of the invention.

BRIEF DESCRIPTION OF THE INVENTION

The present invention is directed to providing an apparatus and a method for detecting when a moving body assumes a substantially motionless state. The apparatus of the invention includes a rate of turn sensor attached to the body for generating a rate of turn signal exhibiting an amplitude which is proportional to the rate of turn of the body. A rate of turn signal processor is electrically coupled to the rate of turn sensor. Such signal processor generates a first signal when the rate of turn signal is substantially constant to indicate that the body is substantially motionless.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

BRIEF DESCRIPTION OF THE DRAWINGS

FIG. 3 is a representation of an apparatus for detecting when a moving body has assumed a motionless state in accordance with the present invention.

DESCRIPTION OF THE PREFERRED EMBODIMENT

Figure 1:
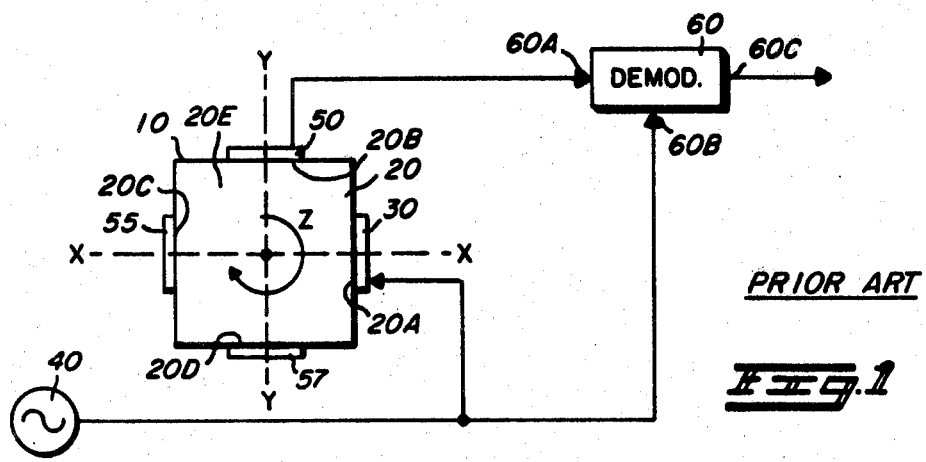
FIG. 1 is a representation of a conventional vibratory bar rate gyro sensor.
Figure 2A:
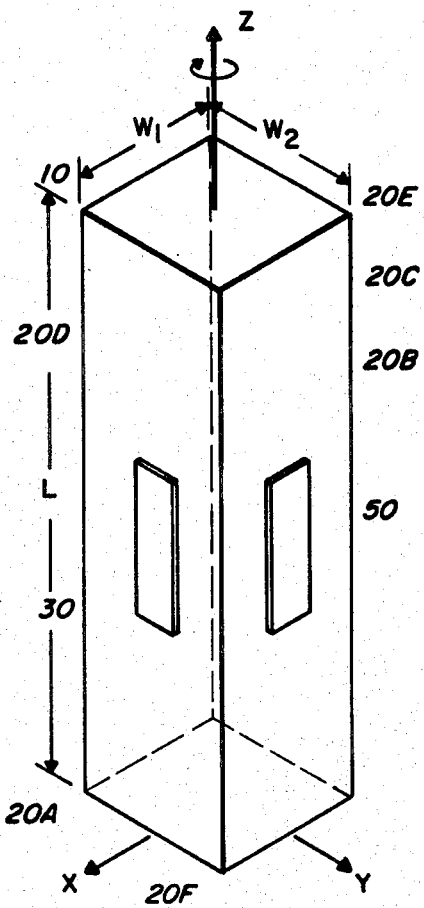
FIG. 2A is a perspective view of the vibratory bar gyro of FIG. 1.
Figure 2B:
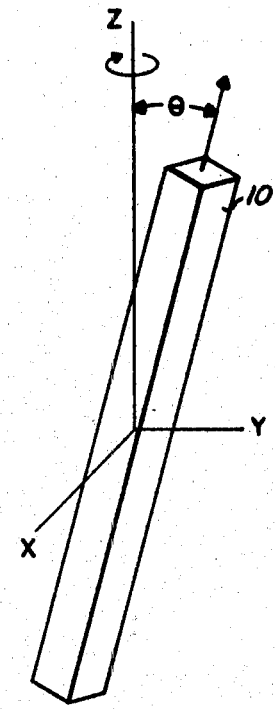
FIG. 2B is a representation of the vibratory bar gyro of FIG. 1 shown inclinded with respect to the X, Y, and Z axes.

FIG. 3 is a representation of apparatus for determining when a moving vehicle becomes substantially motionless in accordance with the present invention. Such apparatus will be henceforth referred to as a stopped vehicle detection apparatus although it is understood that such apparatus may be employed to determine when other moving bodies become motionless as well. The stopped vehicle detection apparatus includes a rate gyro, for example, a vibrating bar gyro 10, mounted in a moving body (not shown). Gyro 10 has already been discussed in detail in the Description of the Prior Art. An alternating current source 40 is electrically coupled to driver transducer 30. Source 40 generates a signal having a frequency near the resonant frequency of substrate 20. Substrate 20 and transducer 30 are thus excited into vibration by source 40. Readout transducer 50 is coupled to an input 60A of demodulator 60 such that the $V_r$ readout signal generated by readout transducer 50 is provided to demodulator 60. The output of source 40 is coupled to a reference input 60B of demodulator 60 such that demodulator 60 synchronously demodulates the $V_r$ signal with respect to the signal from source 40 provided to driver transducer 30. The synchronously demodulated $V_r$ signal is generated at output 60C and is designated $V_d$ (Equation 2). The electrical connections among gyro 10, source 40 and demodulator 60 as well as their functions have already been described in the Description of the Prior Art but have been partially reiterated in this paragraph to facilitate understanding of the invention.

Figure 4:
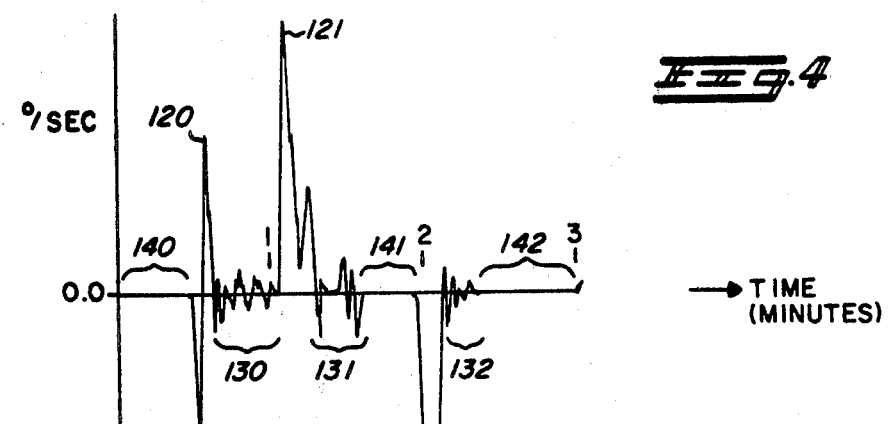
FIG. 4 is an amplitude versus time graph of the rate of turn signal generated at the output of the rate of turn sensor included in the apparatus of the invention.

It is understood that gyro 10, source 40 and demodulator 60 cooperate to form a rate of turn sensor 65 as shown in FIG. 3. Rate of turn sensor 65 generates a signal ($V_d$) at output 60C which exhibits an amplitude proportional to the rate of turn of the moving body (vehicle). A typical $V_d$ signal is shown in the graph of FIG. 4 in which the X axis represents time in minutes and the Y axis represents rate of turn in degrees (°) per second. Positive peaks 120 and 121 represent hard right turns, that is, turns approaching 90° in the right hand direction with respect to the moving body. Negative peaks 122 and 123 represent hard left turns, that is, turns approaching 90° in the left hand direction with respect to the moving body. During time intervals 130, 131 and 132, it is observed that the $V_d$ signal exhibits some varying amplitude greater than zero. The relatively low level $V_d$ signals during time intervals 130, 131 and 132 indicate that the vehicle is proceeding in a substantially straight direction. The amplitude variations of the $V_d$ signal during these time intervals are accounted for by the number of relatively small turns that are needed to keep the vehicle going in a substantially straight direction while the vehicle is moving. When a vehicle is moving, it is essentially always turning to at least some small degree. Thus, when the vehicle is moving, the rate of turn signal ($V_d$) will exhibit some finite varying amplitude. However, if the vehicle is stopped, the rate of turn signal ($V_d$) will exhibit a substantially constant amplitude, as in time intervals 140, 141 and 142 wherein $V_d$ is approximately equal to zero.

Referring again to FIG. 3, a rate of turn signal processing circuit 67 is electrically coupled to the output of rate of turn sensor 65 (demodulator output 60C) to process the rate of turn signal $V_d$ to generate a signal whenever $V_d$ is substantially constant to thus indicate that the vehicle is substantially motionless.

In one embodiment of the invention, signal processing circuit 67 includes a differentiator 70 electrically coupled to demodulator output 60C. Differentiator 70 differentiates the rate of turn signal $V_d$ provided thereto. A high pass filter such as a series capacitor is one circuit which may be employed as differentiator circuit 70.

Figure 5:
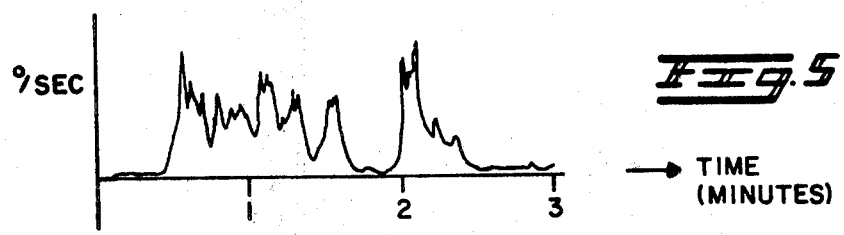
FIG. 5 is an amplitude versus time graph of the signal generated at the output of the absolute value circuit included in the invention.

An absolute value circuit 80 is electrically coupled to the output of differentiator 70 for determining the absolute value of the differentiated rate of turn signal $V_d$ provided thereto. A full wave rectifier is one circuit which is used to implement absolute value circuit 80. A typical waveform generated at the output of absolute value circuit 80 in response to the rate of turn signal $V_d$ of FIG. 4 is shown in the graph of FIG. 5 wherein the X axis represents time and the Y axis represents the absolute value of the differentiated $V_d$ signal in degrees (°) per second.

Referring again to FIG. 3, a limiter circuit 90 is electrically coupled to the output of absolute value circuit 80 to assure that the amplitude of signals provided thereto does not exceed a selected level (limiter voltage). In one embodiment of the invention, the selected level is chosen to limit the relatively large derivatives of the rate of turn signal exhibited when the moving body (vehicle) turns a corner or makes a sudden change in heading. Limiter circuits are well known to those skilled in the art.

Figure 6:
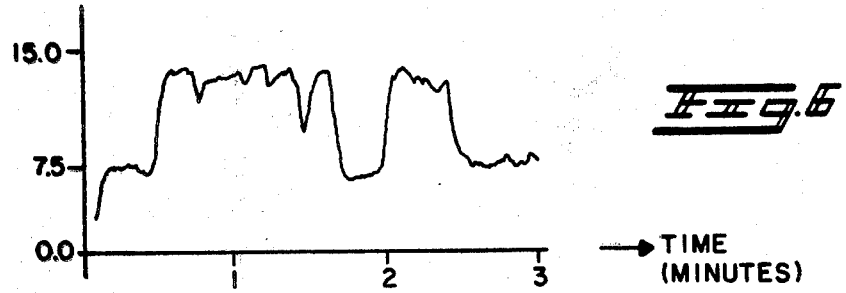
FIG. 6 is an amplitude versus time graph of the signal generated at the output of the integrator included in the invention.

A low pass filter circuit 100 is electrically coupled to the output of limiter 90 to filter the limited signals provided thereto by limiter 90. A parallel capacitor to ground is one circuit which may be employed as filter circuit 100. The signal generated at the output of integrator 100 is designated the filtered stopped vehicle signal, an example of which is shown in the graph of FIG. 6. The amplitudes depicted in FIG. 6 are relative.

Figure 7:
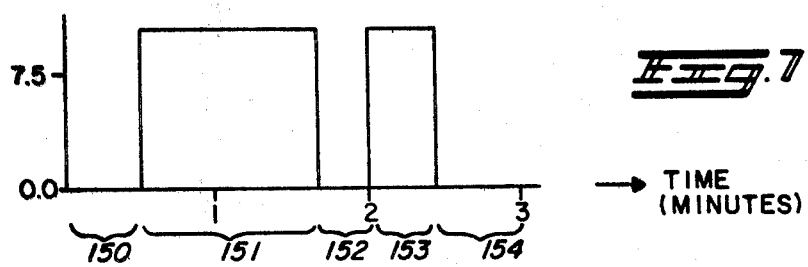
FIG. 7 is an amplitude versus time graph of the stopped vehicle signal generated at the output of the apparatus of the invention.

Returning to FIG. 3, a comparator circuit 110 is electrically coupled to the output of filter circuit 100 to compare the filtered stopped vehicle signal to a predetermined threshold voltage. If the filtered stopped vehicle signal equals or exceeds the threshold voltage, comparator 110 generates a logical one or high output signal to indicate the vehicle is moving as in time intervals 151 and 153 of FIG. 7. However, if the filtered stopped vehicle signal is less than the threshold voltage, comparator 110 generates a logical zero or low output signal to indicate that the vehicle is substantially motionless as in time intervals 150, 152 and 154 of FIG. 7. It is understood that the threshold voltage of comparator 110 is set according to the amount of sensitivity to vehicle motion desired. Typically, the threshold voltage is approximately one half of the limit voltage associated with limiter 90.

In the above discussion, a method as well as an apparatus for detecting when a moving body assumes a motionless state are described. Such method is summarized as including the following steps. Sensing of the rate of turn of the body is provided to generate a rate of turn signal exhibiting an amplitude which is proportional to the rate of turn of the body. The rate of turn signal is differentiated to generate a differentiated signal. An absolute value signal is generated equal to the absolute value of the differentiated signal. The amplitude of the absolute value signal is limited to a predetermined signal level to generate a limited signal. The limited signal is filtered to generate a filtered signal. The filtered signal is compared to a predetermined voltage level to generate a first signal when the filtered signal is less than the predetermined voltage level to thus indicate that the body is substantially motionless.

The foregoing describes an apparatus and method for accurately detecting when a moving body assumes a motionless state by employing signals derived from a rate of turn sensor.

While only certain preferred features of the invention have been shown by way of illustration, many modifications and changes will occur to those skilled in the art. It is, therefore, to be understood that the present claims are intended to cover all such modifications and changes as fall within the true spirit of the invention.

We claim:

1. An apparatus for detecting when a moving body assumes a substantially motionless state comprising:
   rate of turn sensor means attached to said body for generating a rate of turn signal exhibiting an amplitude which is proportional to the rate of turn of said body;
   differentiator means, electrically coupled to said sensor means, for differentiating said rate of turn signal to generate a differentiated signal;
   absolute value circuit means, electrically coupled to said differentiator means, for generating an absolute value signal equal to the absolute value of said differentiated signal;
   limiter means, electrically coupled to said absolute value circuit means, for limiting the amplitude of said absolute value signal to a predetermined signal level, thereby generating a limited signal;
   filtering means, electrically coupled to said limiter means, for filtering said limited signal, thereby generating an filtered signal, and
   comparator means, electrically coupled to said filter means, for generating a first signal when said filtered signal is less than a predetermined voltage level to indicate that said body is substantially motionless.

2. The apparatus of claim 1 wherein said rate of turn sensor means comprises a rate gyro.

3. The apparatus of claim 1 wherein said rate of turn sensor means comprises a vibrating bar rate gyro.

4. The apparatus of claim 1 wherein said filtering means comprises a low pass filter.

5. A method of detecting when a moving body assumes a substantially motionless state comprising the steps of;
   A. sensing the rate of turn of said body to generate a rate of turn signal exhibiting an amplitude which is proportional to the rate of turn of said body;
   B. differentiating said rate of turn signal to generate a differentiated signal;
   C. generating an absolute value signal equal to the absolute value of said differentiated signal;
   D. limiting the amplitude of said absolute value signal to a predetermined signal level to generate a limited signal;
   E. filtering said limited signal to generate an filtered signal, and
   F. comparing said filtered signal to a predetermined voltage level to generate a first signal when said filtered signal is less than said predetermined voltage level to indicate that said body is substantially motionless.

6. The method of claim 5 step E comprises low pass filtering said limited signal to generate a filtered signal.

* * * * *